United States Patent
Muszinski et al.

(10) Patent No.: US 11,760,618 B2
(45) Date of Patent: Sep. 19, 2023

(54) CONTAINER-PROCESSING DEVICE

(71) Applicant: KHS GmbH, Dortmund (DE)

(72) Inventors: Olaf Muszinski, Kelkheim (DE); Andreas Fahldieck, Idar-Oberstein (DE); Thomas Stolte, Bad Kreuznach (DE); Dominik Weirich, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 92 days.

(21) Appl. No.: 17/621,310

(22) PCT Filed: Jun. 23, 2020

(86) PCT No.: PCT/EP2020/067452
§ 371 (c)(1),
(2) Date: Dec. 21, 2021

(87) PCT Pub. No.: WO2020/260253
PCT Pub. Date: Dec. 30, 2020

(65) Prior Publication Data
US 2022/0356055 A1    Nov. 10, 2022

(30) Foreign Application Priority Data
Jun. 27, 2019   (DE) ..................... 10 2019 117 382.5

(51) Int. Cl.
*B67C 7/00*   (2006.01)
*B65G 47/52*   (2006.01)
(Continued)

(52) U.S. Cl.
CPC ............ *B67C 7/0046* (2013.01); *B65G 47/52* (2013.01); *B65G 47/846* (2013.01); *B67C 3/24* (2013.01);
(Continued)

(58) Field of Classification Search
CPC ...... B65G 47/846; B65G 47/52; B65G 47/84; B67C 7/00; B67C 7/0046; B67C 3/24
See application file for complete search history.

(56) References Cited

U.S. PATENT DOCUMENTS 1,047,288 A * 12/1912 Radack ................ B65G 47/846
198/478.1
1,301,348 A    4/1919 Stetson
(Continued)

FOREIGN PATENT DOCUMENTS

DE   102005042275 A1   3/2007
DE   102017112220 A1   12/2018
(Continued)

OTHER PUBLICATIONS

International Search Report and Written Opinion, PCT Application No. PCT/EP2020/067452, dated Oct. 2, 2020 (18 pages).

*Primary Examiner* — James R Bidwell
(74) *Attorney, Agent, or Firm* — Occhiuti & Rohlicek LLP

(57) ABSTRACT

A filling machine includes a rotor comprising plural container-filling positions, an inflow star upstream from the rotor, and a linear conveyor downstream of the rotor that receives the container from the rotor at an outflow point after the container has been filled but before the container has been closed. An interface having a curved portion receives the container at the outflow point and conveys the container toward the linear conveyor.

13 Claims, 2 Drawing Sheets

(51) Int. Cl.
*B65G 47/84* (2006.01)
*B67C 3/24* (2006.01)

(52) U.S. Cl.
CPC ............... *B65G 2201/0244* (2013.01); *B67C 2007/006* (2013.01)

(56) References Cited

U.S. PATENT DOCUMENTS

| | | | | |
|---|---|---|---|---|
| 5,695,041 A | * | 12/1997 | Kouda | ............... B65G 47/846 198/459.2 |
| 2005/0045244 A1 | | 3/2005 | Hartness et al. | |
| 2020/0207551 A1 | * | 7/2020 | Fahldieck | ............... B65G 47/52 |
| 2022/0356020 A1 | * | 11/2022 | Muszinski | ......... B65G 21/2072 |

FOREIGN PATENT DOCUMENTS

| | | | | |
|---|---|---|---|---|
| EP | 544617 | * | 11/1992 | ............... B67C 7/00 |
| EP | 3640198 | * | 9/2019 | ............... B67C 7/00 |
| EP | 3838813 | * | 12/2020 | ............. B65G 47/84 |
| JP | H09142649 A | | 6/1997 | |
| JP | 2001287794 A | | 10/2001 | |
| JP | 2005145477 A | | 6/2005 | |
| WO | 97/38930 | * | 4/1997 | ............. B65G 47/84 |
| WO | 2020164953 A1 | | 8/2020 | |

* cited by examiner

CONTAINER-PROCESSING DEVICE

RELATED APPLICATIONS

This application is the national stage of international application PCT/EP2020/067452, filed on Jun. 23, 2021, which claims the benefit of the Jun. 27, 2019 priority date of German application DE 102019117382.5, the contents of which are incorporated herein by reference.

FIELD OF INVENTION

The invention relates to a container-processing device, in particular a filling machine for filling cans or similar containers with liquid contents.

BACKGROUND

A typical filling machine has a rotor with filling positions around its circumference. As the rotor rotates, a filling position arrives at a receiving position and receives a container and carries it along a circular path towards a discharging position. Between the receiving position and the discharging position, the filling position must complete the filling process. Upon arriving at the discharging position, the container, which is filled but not yet closed, is taken away and brought to a closing machine.

The angle between the receiving position and the discharging position defines a processing angle during which the filling operation must be completed. It is therefore useful for this angle to be as large as possible, thereby giving the container more time to be filled.

In the course of its journey, the container experiences various centrifugal accelerations. When a container is filled but not closed, changes in centrifugal acceleration can cause spillage. These centrifugal accelerations arise in part from changes in the curvature of the path travelled by the container. A particularly large change in acceleration just as the container is taken from the rotor.

In many cases, a container is transferred from the rotor to a linear conveyor that extends along a line tangent to the circle defined by the rotor. At the point of tangency between this line and the rotor, a container's velocity vector is directed along this tangent line. Therefore, by removing the container from the rotor at this point of tangency, it is possible to transfer the container with essentially no change in centrifugal acceleration.

With this being the case, filling must be completed within the time the container traverses a processing angle that extends between the point at which the container arrives at the rotor to be filled and the point of tangency. This imposes a limit on the processing angle.

SUMMARY

An object of the invention is to provide an apparatus comprising a filling machine for filling cans or similar containers with a liquid filling product that has a processing angle greater than that hitherto available in the art while maintaining a footprint that is consistent with that found in the art, and that avoids causing containers to experience transverse jerk.

In one aspect, the invention features a container-processing device, in particular a filling machine for the filling of cans or similar containers with a liquid filling product as the containers move along a container-processing path running in a processing direction.

The container-processing device comprises a first transporter and a rotor downstream of the first transporter in the processing direction. The rotor has plural processing positions for the processing of the containers. The device also includes a second transporter that is disposed downstream of the rotor. As used herein, "upstream" and "downstream" refer to processing direction.

The first transporter is configured as an inflow star that transfers containers to be filled to the rotor at an inflow point as the rotor rotates about a machine axis thereof.

The second transporter is configured as a linear conveyor that removes filled but still open containers from the rotor's outflow point and conveys them onward.

Between the inflow point and an outflow point of the rotor is a circular-arc-shaped processing region with a predetermined processing arc length. The filling process is carried out while containers are in this processing region.

In order to increase the processing arc length of the circular-arc-shaped processing region, the apparatus includes an at least partially curved interface arranged upstream of the second transporter for receiving the containers at the outflow point and transferring the containers thus received to the second transporter. In an alternative embodiment, the second transporter comprises an at least partially curved interface that receives containers at the outflow point.

In some embodiments, the interface connects the outflow point of the rotor to the second transporter.

Other embodiments include those in which the container traverses a first curved portion, which has at least one and possibly more curved sections, after which it traverses a straight line.

In still other embodiments, the interface comprises the first curved portion. Among these are embodiments in which the second curved portion is a section of the second transporter and/or a section of the interface.

Also among the embodiments are those in which the container traverses first and second curved portions follows by a straight portion.

In other embodiments, the interface causes an angle is formed between the inflow point and the outflow point to be smaller than an angle between the inlet point and the tangential outflow point of a second transporter that runs exclusively in a straight line.

In still other embodiments, the first curved portion comprises several transition-curve portions having different curvature directions. Among these are embodiments in which there is a left-curvature in the first transition-curve portion, a right-curvature in the second transition-curve portion, and a left-curvature in the third transition-curve portion.

In still other embodiments, the first curved portion has one or more transition-curve portions, one or more of which are adjustable. These are adjustable by a motor-controlled adjuster or regulated by a feedback control system.

In still other embodiments, guide rails define a channel along which a container travels. The guide rails then guide the containers along the channel. Among these are embodiments in which guide rails of a first curved portion and guide rails of a second portion, which may or may not be curved, are flush with each other.

Other embodiments include those in which at least one transition-curve portion of the first curved portion is configured as a portion of a clothoid, a portion of a Bloss curve, a portion of a polynomial, or a portion of a trigonometric function. Where a curve is referred to, it is to be understood that only a portion of the curve is meant since the domains of the functions identified are infinite.

As used herein, a "clothoid" is a curve having a linearly increasing curvature such that the product of the curve radius and arc length of the curve is constant, as a result of which the curvature at each point of the curve is proportional to the length of its arc up to that point.

As used herein, a "containers" includes bottles, cans, beakers, etc., in each case made of metal, glass, and/or plastic, such as polyethylene terephthalate.

Further embodiments, advantages, and possible applications of the invention also derive from the following description of exemplary embodiments and from the Figures. In this situation, all the features described and/or represented in the figures are in principle the object of the invention, alone or in any combination, regardless of their association in the claims or reference to them. The contents of the claims are also deemed to be a constituent part of the description.

BRIEF DESCRIPTION OF THE FIGURES

The invention is explained in greater detail hereinafter on the basis of the Figures in relation to exemplary embodiments. The figures show.

Identical reference numbers are used in the figures for elements of the invention which are the same or have the same effect. Moreover, for the sake of easier overview, only reference numbers are represented in the individual figures which are required for the description of the respective figure.

DETAILED DESCRIPTION

Figure 1:
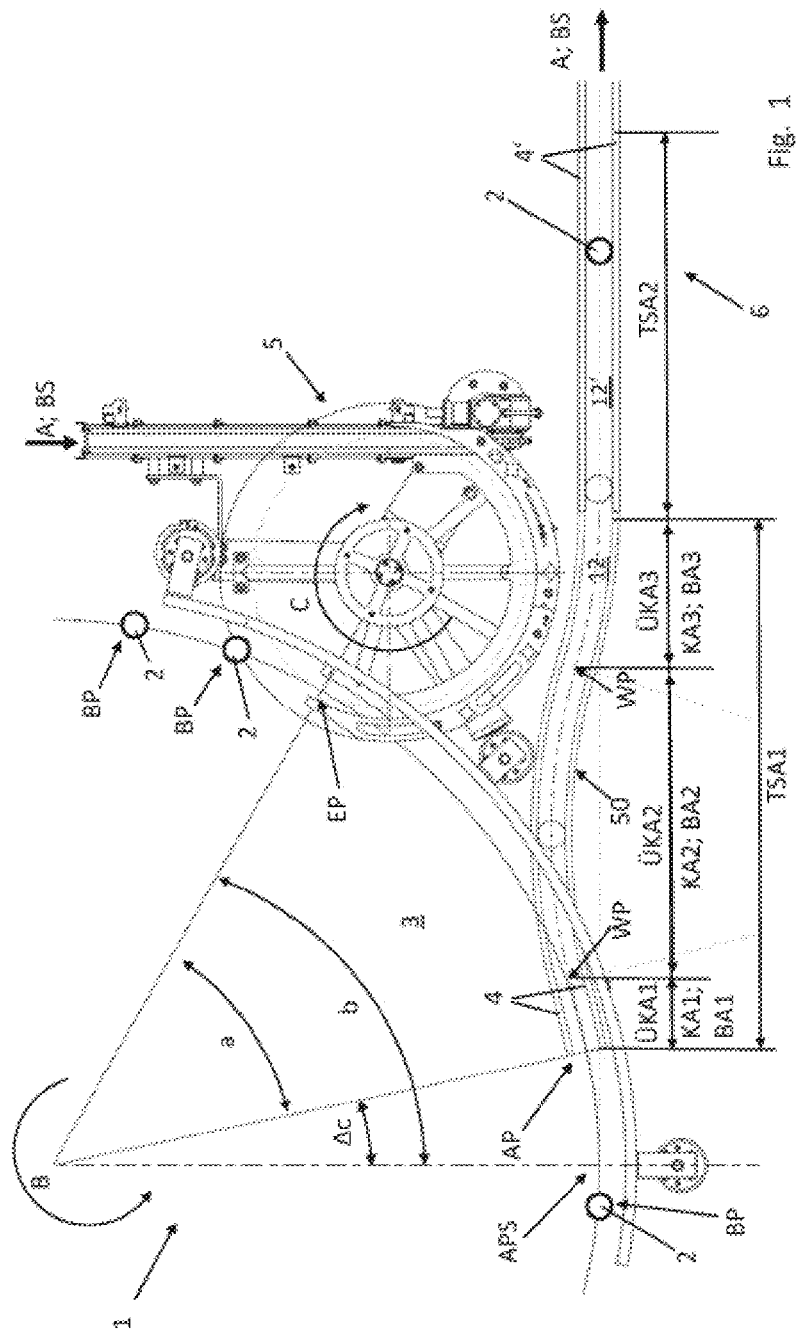
FIG. 1 shows a plan view of a filling machine.

FIG. 1 shows a filling machine 1 that pressure fills containers with such liquid contents as beer or soft drinks. The filling machine 1 conveys containers 2 along a container-processing path BS that runs in a processing direction "A."

The filling machine 1 includes a rotor 3 that rotates in a rotation direction "B" about a vertical machine axis. Along its circumference, the rotor 3 has processing positions BP that are distributed at equal distances from each other around the rotor's circumference. Filling of containers 2 occurs at these processing positions BP.

A container 2 that is to be filled is transferred from a first transporter 5 to the rotor 3 at a tangential inflow point EP. In the illustrated embodiments, the first transporter 5 is an inflow star rotating in an inflow rotation-direction "C" that is counter to the rotor's direction-of-rotation.

The container then travels along a circular arc from the inflow point AP to an outflow point AP. As it does so, it traverses a processing arc during which it is filled.

At the outflow point AP, containers 2 that have been filled but not yet closed are removed and taken to a closing machine. The angle "a" between the inflow point EP and the outflow point AP governs the extent of the processing arc. In particular, the processing arc's extent is given by subtracting the angle "a" from 360°.

To reduce the angle "a" and therefore increase the usable processing arc, it is useful to provide a curved interface 50 upstream of a second transporter 6. In the illustrated embodiment, the second transporter 6 comprises a linear conveyor.

The curved interface 50 receives containers 2 at the outflow point AP and transfers them to the second transporter 6. In the course of being transferred, the container 2 traverses one or more curved sections of the interface 50.

In the course of being transferred from the rotor 3 to the second transporter 6, a container 2 encounters a change in the curvature of its path. This causes the container 2 to experience centripetal acceleration.

Upon leaving the outflow point AP, the container 2 traverses a curved portion TSA1 along the container-processing path BS until it reaches a straight portion TSA2. The container 2 then continues to move along the straight portion TSA2.

Figure 2:
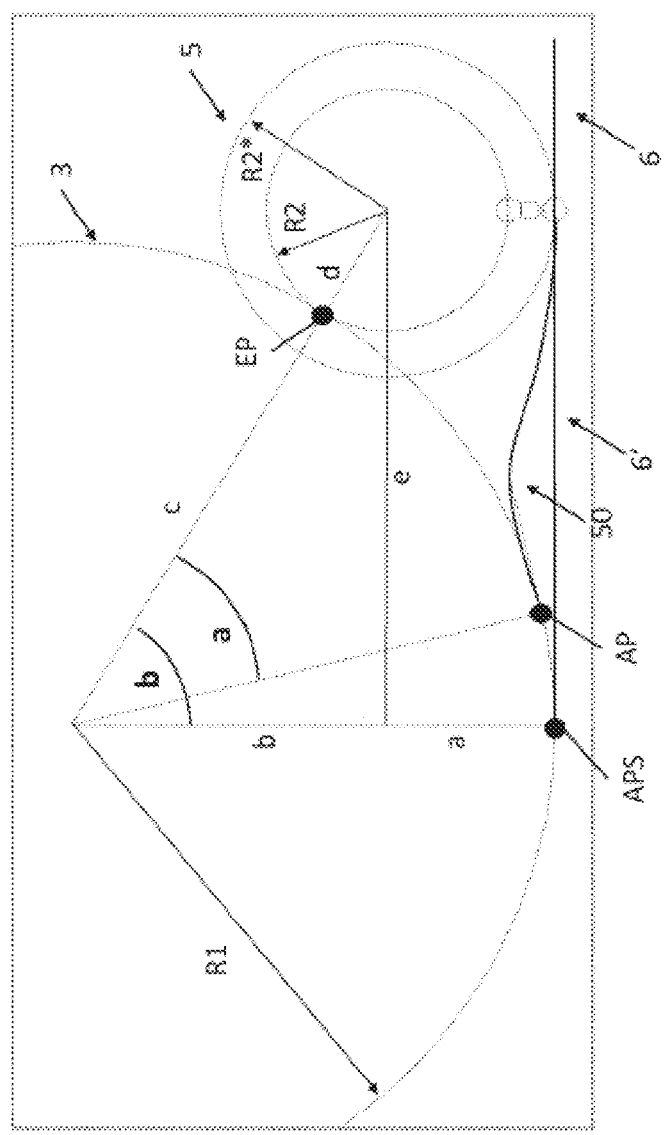
FIG. 2 shows certain geometric features of the filling machine shown in FIG. 1.

As shown in FIG. 2, the interface 50 causes the angle "a" to be smaller than an angle "b" that is between the inflow point EP and a tangential outflow point APS that would otherwise lead to a second transporter 6' that extends in a straight line with no curved section. The angle "b" therefore exceeds the angle "a" by an amount that subtends the portion of the arc between the inflow point EP and the tangential outflow point APS.

FIG. 2 shows a first radius R1, which is that of the rotor 3, a second radius R2, which is that of the first transporter 6, and an envelope radius R2*. This envelope radius R2* is the second radius added to the sum of the container diameter, the width of the guide at the first transporter, and the width of the guide at the second transporter.

Also shown is a first radial line "c" that connects the rotor's machine axis with the inflow point EP and a second radial line "b+a" that connects the machine axis to the outflow point APS.

The angle "b" is thus given by $b = \arccos((R1-R2^*)/(R1+R2))$

The second radius R2, the diameter of the containers 2, the width of the guide at the inflow star 5, and the width of the guide at the second transporter 6 determine the envelope radius R2*, and therefore the location of the outflow point APS, which is on a line tangent to the rotor 3.

The interface 50 permits the location of the outflow point AP to be displaced towards the inflow point EP. This, in turn, reduces the angle "b" by $\Delta c$ as shown in FIG. 1. This difference angle $\Delta c$ enlarges the rotor's processing angle. The interface 50 thus increases the usable container-processing angle as the processing arc length of the rotor's processing region from $(2\pi - b)$ to $(2\pi - a)$.

The interface 50 comprises a curved portion TSA1 that comprises one or more transition-curve portions ÜKA1, ÜKA2, ÜKA3. In those cases in which two or more transition-curve portions ÜKA1, ÜKA2, ÜKA3 are present, adjacent transition-curve portions ÜKA1, ÜKA2, ÜKA3 have curvatures of different signs, where a curvature's sign is defined by the cross product of the container's radial vector and velocity vector. As used herein, "left-curvature" and "right-curvature" will refer to curvatures of opposite sign.

In the illustrated embodiment, the curved portion TSA1 comprises a first transition-curve portion ÜKA1 having a left-curvature, a second transition-curve portion ÜKA2 having a right-curvature, and a third transition-curve portion ÜKA3 having a left-curvature.

In some embodiments, one or more of the transition-curve portions ÜKA1, ÜKA2, ÜKA3 are adjustable by an adjuster that is controlled by hand or with a motor. In the latter case, a feedback control system regulates such adjustment.

As shown in FIG. 1, guide rails 4, 4' guide containers 2 along channels 12, 12'. In a preferred embodiment, guide rails 4, 4' associated the curved portion TSA1 and a straight portion TSA2 along the linear conveyor 6 are flush with each other, thus forming flush channels 12, 12'. In some embodiments, the guide rails 4 along one or more transition-curve portion ÜKA1, ÜKA2, ÜKA3 are adjustable so as to adjust the curvature of the path along which the containers 2 travel. Among these are embodiments in which the channels formed in different transition-curve portions ÜKA1, ÜKA2 are adjustable independently of one another.

Among the embodiments are those in which at least one transition-curve portion ÜKA1, ÜKA2, ÜKA3 of the curved portion TSA1 is configured as a clothoid KA1, KA2, KA3, as shown in FIG. 1, or as a Bloss curve.

In FIG. 1, the second clothoid KA2 connects directly to the first clothoid KA1, and to the third clothoid KA3. The individual clothoid KA1, KA2, KA3 connect to each other at respective turning points WP at which a change in the curvature's sign takes place, for example between point WP, for example from right-curvature and left-curvature.

Each clothoid portions KA1, KA2, KA3 has its origin at a corresponding turning point WP, where its clothoid radius is infinite. As a result, transfer between clothoid portions KA1, KA2, KA3 takes place where there is effectively no curvature.

In alternative embodiments, the curved portion TSA1 comprises one or more transport path regions that are straight and that extend between corresponding transition-curve portions ÜKA1, ÜKA2, ÜKA3, each of which forms a portion of a clothoid. The geometry of the curved portion TSA1 is therefore selectable based on specific circumstances, such as the first transporter's diameter or that of the rotor 3.

Transition curves other than clothoids are usable. Among these are portions of a Bloss curve as well as portions defined by polynomials and portions defined by trigonometric functions. The invention has been described heretofore on the basis of exemplary embodiments. It is understood that a large number of modifications or derivations are possible without thereby departing from the scope of protection of the invention as defined by the claims. The contents of the claims are also declared to be the object of the description.

The invention claimed is:

1. An apparatus comprising a filling machine for filling a container with liquid content as said container moves along a processing path that extends in a processing direction, said filling machine comprising a rotor comprising plural container-filling positions, an inflow star upstream from said rotor, said inflow star being configured to transfer said container to said rotor at an inflow point, a linear conveyor downstream of said rotor that receives said container from said rotor at an outflow point after said container has been filled but before said container has been closed, a processing region defined by a circular arc between said inflow point and said outflow point, said circular arc having an arc length that accommodates some of said container-filling positions, and an interface having a curved portion that receives said container at said outflow point and conveys said container toward said linear conveyor, wherein said curved portion of said interface comprises first, second, and third transition curve portions, said second transition curve portion being between said first and third transition curve portions, wherein said second transition curve section has a curvature that is opposite in sign from said first and third transition curve portions.

2. The apparatus of claim 1, wherein said interface connects said outflow point of said rotor with said linear conveyor.

3. The apparatus of claim 1, wherein said interface further comprises a straight portion that follows said curved portion.

4. The apparatus of claim 1, wherein said container, upon being received by said interface, is conveyed along said curved portion of said interface and transferred onto said linear conveyor for transport along a straight line.

5. The apparatus of claim 1, wherein said curved portion comprises plural transition-curve portions that define an adjustable curve path.

6. The apparatus of claim 1, further comprising guide rails that define a channel along which said container moves along said interface, wherein said guide rails extend along at least one transition-curve portion of said interface.

7. The apparatus of claim 1, further comprising first guide rails and second guide rails, wherein said first guide rails extend along said interface and said second guide rails extend along said linear conveyor, and wherein said first and second guide rails are flush with each other.

8. The apparatus of claim 1, wherein said curved portion of said interface comprises a clothoid.

9. The apparatus of claim 1, wherein said curved portion of said interface comprises a Bloss curve.

10. The apparatus of claim 1, wherein said curved portion of said interface comprises a curve that is defined by a polynomial.

11. The apparatus of claim 1, wherein said curved portion of said interface comprises a curve that is defined by one or more trigonometric functions.

12. An apparatus comprising a filling machine for filling a container with liquid content as said container moves along a processing path that extends in a processing direction, said filling machine comprising a rotor comprising plural container-filling positions, an inflow star upstream from said rotor, said inflow star being configured to transfer said container to said rotor at an inflow point, a linear conveyor downstream of said rotor that receives said container from said rotor at an outflow point after said container has been filled but before said container has been closed, a processing region defined by a circular arc between said inflow point and said outflow point, said circular arc having an arc length that accommodates some of said container-filling positions, and an interface having a curved portion that receives said container at said outflow point and conveys said container toward said linear conveyor, wherein said linear conveyor is disposed along a line that is tangent to a circle defined by said rotor at a tangent point, wherein said circle has first, second, and third radial lines that extend between said circle's center and said inflow point, said tangent point, and said outflow point respectively, and wherein the smaller of two angles defined by said first and third radial lines is less than the smaller of two angles defined by said first and second radial lines.

13. An apparatus comprising a filling machine for filling a container with liquid content as said container moves along a processing path that extends in a processing direction, said filling machine comprising a rotor comprising plural container-filling positions, an inflow star upstream from said rotor, said inflow star being configured to transfer said container to said rotor at an inflow point, a linear conveyor downstream of said rotor that receives said container from said rotor at an outflow point after said container has been filled but before said container has been closed, a processing region defined by a circular arc between said inflow point and said outflow point, said circular arc having an arc length that accommodates some of said container-filling positions, and an interface having a curved portion that receives said container at said outflow point and conveys said container toward said linear conveyor, wherein said linear conveyor is disposed along a line that is tangent to a circle defined by said rotor at a tangent point, wherein said circle has first and second radial lines that extend between said circle's center and said inflow point and said tangent point, respectively, wherein said circular arc's arc length is greater than an arc length defined by said first radial line and said second radial line.

* * * * *